United States Patent [19]

Davis

[11] Patent Number: 4,613,752

[45] Date of Patent: Sep. 23, 1986

[54] FIBER OPTIC FORCE MEASURING DEVICE

[75] Inventor: Charles M. Davis, McLean, Va.

[73] Assignee: Optical Technologies, Inc., Herndon, Va.

[21] Appl. No.: 520,247

[22] Filed: Aug. 4, 1983

[51] Int. Cl.⁴ ............................................. G01P 15/00
[52] U.S. Cl. ...................... 250/227; 73/515; 250/231 R; 350/96.15; 356/345
[58] Field of Search ............... 250/227, 231 R, 231 P; 73/649, 653, 655–657, 786, 800, 510–515; 350/96.15; 356/35.5, 345

[56] References Cited

U.S. PATENT DOCUMENTS

| | | | |
|---|---|---|---|
| 3,524,031 | 8/1970 | Mack | 73/515 |
| 4,173,412 | 11/1979 | Ramsay et al. | 356/73.1 X |
| 4,319,186 | 3/1982 | Kingsley | 350/96.29 X |
| 4,322,829 | 3/1982 | Davis, Jr. et al. | 73/653 |
| 4,466,295 | 8/1984 | Wesson | 73/800 X |

OTHER PUBLICATIONS

Charles M. Davis, "An Introduction to Fiberoptic Sensors", Laser FOCUS Magazine, Feb. 1982, pp. 112–115, Advanced Technology Publications Inc., 1001 Watertown St., Newton, MA 02165.

*Primary Examiner*—Edward P. Westin
*Attorney, Agent, or Firm*—Kerkam, Stowell, Kondracki & Clarke

[57] ABSTRACT

A force measuring device generally comprising a hollow, three-dimensional container defining interiorly thereof at least one chamber is disclosed. The device includes at least a pair of optical fiber coils with the length of the optical fiber on each of the coils being substantially equal. The pair of coils are mounted on opposite sides of a wall of the hollow container and there are means within the container normally exerting a force on the coil mounted within the container. The system also includes an optical interferometer having a pair of legs with means connecting each of the pair of coils in a leg of the interferometer. Radiant energy emitting means are provided for directing radiant energy into the legs of the interferometer and through the pair of coils and radiant energy detecting means are connected to the interferometer.

23 Claims, 10 Drawing Figures

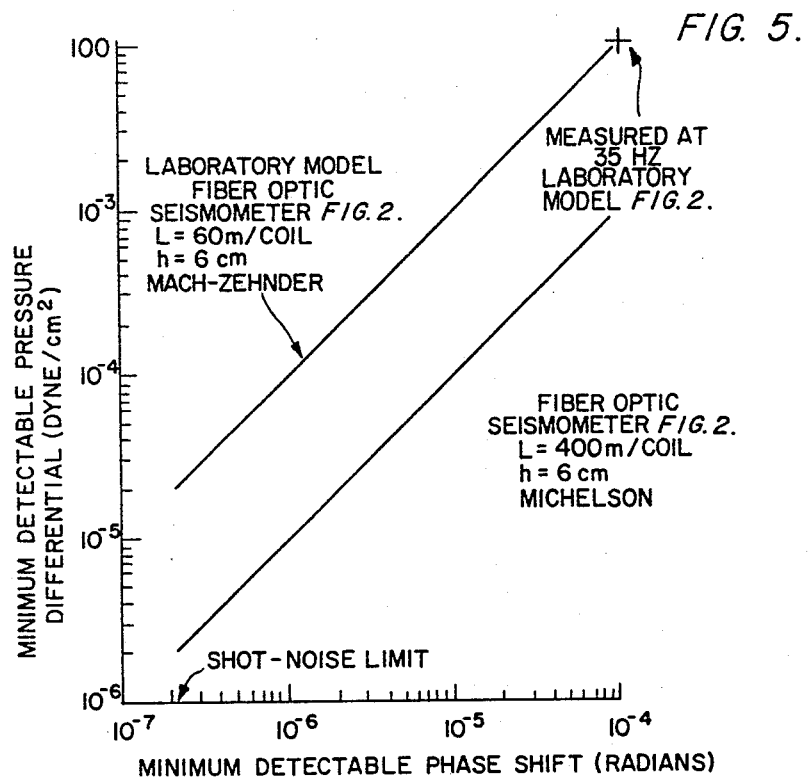
FIG. 5.
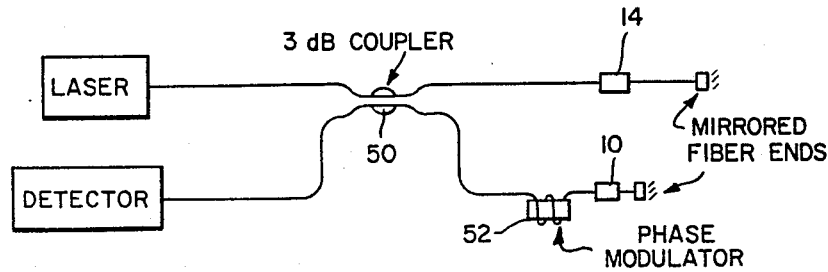
FIG. 6A. (MICHELSON)
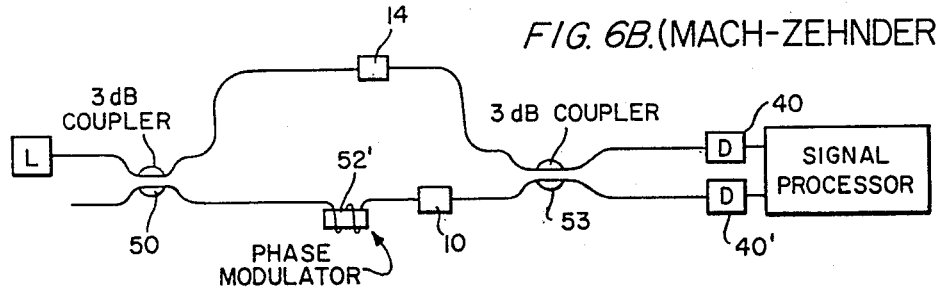
FIG. 6B. (MACH-ZEHNDER)

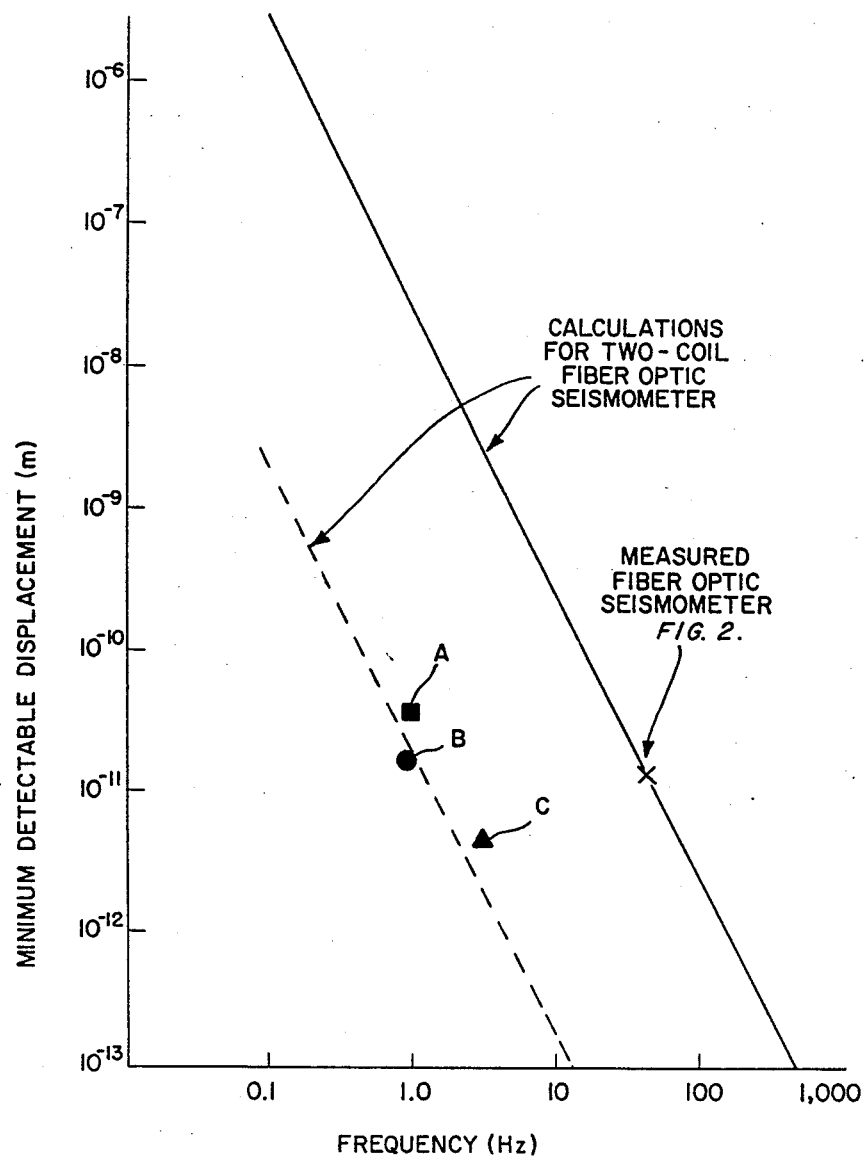

FIBER OPTIC FORCE MEASURING DEVICE

BRIEF SUMMARY OF THE INVENTION

This invention is directed to a force measuring device having particular utility as a seismometer or gravimeter.

The device generally comprises a hollow 3-dimensional container defining interiorly thereof at least one chamber. At least a pair of optical fiber coils; the length of the optical fiber on each of the coils being substantially equal. The pair of coils are mounted on opposite sides of a wall of the hollow container and there are means within the container normally exerting a force on the coil mounted within the container. The system also includes an optical interferometer having a pair of legs with means connecting each of the pair of coils in a leg of the interferometer. Radiant energy emitting means for directing radiant energy into the legs of the interferometer and through the pair of coils; and radiant energy detecting means connected to the interferometer.

BACKGROUND OF THE PRIOR ART

The present off-the-shelf seismometer consists of a sophisticated, expensive (and usually delicate) spring mass system together with a moving coil-magnet transducer. For seismometers with resonant frequencies of 0.5 Hz and above, these mechanical suspensions are rectilinear, consisting of large springs and stiffeners to prevent lateral movement. For seismometers with lower resonant frequencies (for recording longer-period waves) a pendulous spring-mass system is used. Resonant frequencies as low as 0.01 Hz can be achieved. As a class, these pendulous instruments suffer from a suite of mechanical problems: non-linear, parametric, and exaggerated tilt response; mechanical drift; "spring ringing" excited by high-frequency waves; and general lack of robustness. As mentioned previously, both the modern pendulous and rectilinear seismometers utilize coil-magnet combinations to transduce the mass motion to output voltage. This type of transducer also serves the useful function of removing the D.C. and low frequency variations of mass position. These coils can be made with large generator constants $$\left(\sim 10^3 \frac{\mu V}{\mu m/sec}\right)$$

by using many thousands of turns and high magnetic fields (Sm-Co based magnets produce 8–10 K-Gauss). The coil usually operates directly into an operational amplifier. Since the input voltage noise (output voltage noise referred to the input) of a selected op-amp is as low as $0.1\mu$ volts rms over the range 0.1–10 Hz, the threshold velocity sensitivity of this class of modern seismometers is given by:

$$\text{Velocity Sensitivity Threshold} = \frac{.1 \, \mu V}{10^3 \frac{\mu V}{\mu m/sec}} = .1 \text{ mm/sec rms}$$

This corresponds to 0.02 nm rms displacement at 1 Hz or $6 \times 10^{-8}$ gals or $6 \times 10^{-11}$ g's rms. This figure is somewhat optimistic because the op-amp input noise current has been neglected. However, as described elsewhere, this is well below the seismic background level for almost all surface sites. The practical result is that conventional seismometers of this type are deployed worldwide by the thousands.

As it became desirable to record waves of longer periods such as Rayleigh waves, seismometers were developed with increasingly low resonant frequencies. Because of their complexity, the mechanical system suffers increasingly from problems of drift, mechanical instability, and non-linear response. To avoid many of these difficulties, electronic feedback was added to stabilize the mechanical spring-mass system. Since the transfer function of the system then depends mainly on the feedback, the resonant frequency of the spring-mass system need not be so low.

The earth's gravitation field is approximately $10^6$ mgal (mgal=cm/sec$^2$). Variations of 0.3 mgal are produced by the gravitational influence of the moon and sun. The maximum value of many of the anomalies of interest are 1 mgal or less and values of 0.05 mgal or better must be detectable. The various instruments which have been used to measure gravitational fields are pendulums, torsion balances, and gravimeters. The first two are obsolete. Gravimeters are of two basic types: stable and unstable. In the case of stable gravimeters, extremely small displacements due to gravity must be greatly magnified by optical electrical or mechanical means. An example of a stable type is a flat spring wound in a helix with the flat surface parallel to the axis. A mass attached to the spring will cause the spring to rotate as the result of gravitational changes. The rotational motion is much greater than the displacement. Most current gravimeters are the unstable type where changes from equilibrium are counteracted by other forces which decrease the displacement caused by gravity alone An example of this type is the Lacoste and Romberg gravimeter. Springs are often used in gravimeters. These require the thermostatic regulation. A temperature change of 0.002° C. is equivalent to a gravity change of 0.02 mgal in the Lacoste and Romberg gravimeter. Spring devices suffer from drift due to slow creep in the spring. Drifts of 0.01 to 0.02 mgal per hour are not unusual. In addition, temperature regulation is usually required in order to measure small effects

BRIEF DESCRIPTION OF THE DRAWING

The invention will be described in reference to the accompanying drawing wherein FIG. 1 diagrammatically illustrates a single-chamber fiber force measuring device constructed in accordance with the teachings of the present invention;

FIG. 5 is a chart showing calculated and measured minimum detectable pressure differential for a 2-coil fiber optic seismometer of the invention;

FIG. 6A is a diagrammatic view of the force measuring device of the invention in a circuit with a Michelson interferometer;

FIG. 6B is like FIG. 6B showing the device connected to a Mach-Zehnder type interferometer;

FIG. 7 is a chart illustrating calculated and measured response of a prototype fiber optic seismometer and typical conventional seismometers.

DETAILED DESCRIPTION OF THE INVENTION

Figure 1:
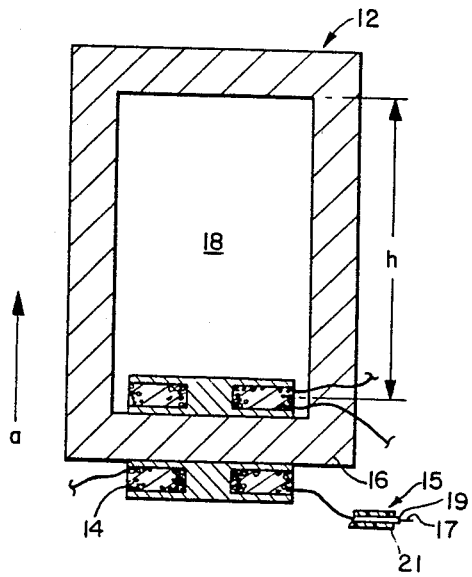

Gravimeters and seismometers respond respectively to small changes in force due to gravity, and relative displacement between the inertial mass and the frame of the instrument. The sensor of the invention measures differential pressure changes by means of two fiber optic coils each located in a different arm of a Michelson or a Mach-Zehnder interferometer. One coil 10 is located at the bottom (or top) of a liquid-filled chamber 18 of cylinder 12, FIG. 1. Assume that the effective column of liquid (density $\rho$) is of height, h. When the device is oriented vertically, there is an excess pressure $\rho gh$, on the coil 10 relative to the top where g is the acceleration due to gravity. If the sensor is given an upward acceleration, a, parallel to the symmetry axis (i.e., parallel to the normal to the coil), then the increased pressure differential is given by $$\Delta P = \rho ah \qquad (1)$$

Similarly, a change in the vertical component of gravity will lead to a pressure differential $$\Delta p = \rho \Delta g h \qquad (2)$$

The second coil 14 is located on the opposite side of the wall 16, which forms the bottom (or top) of the cylinder 12. When the sensor is accelerated, or g changes, the second coil 14 does not see the pressure differential due to the liquid in chamber 18. Since the two coils are close together, they are exposed to nearly identical environmental perturbations (e.g., temperature, vibration). This configuration tends to cancel out such perturbations, and can lead to increased sensitivity. If the sensor is given an acceleration at right angles to the axis of the seismometer then on the average half the fiber on both coils 10 and 14 experience increase in pressure and in the other half, experience an equal and opposite decrease in pressure. Thus, the sensor should be insensitive to cross-axis acceleration.

Figure 2:
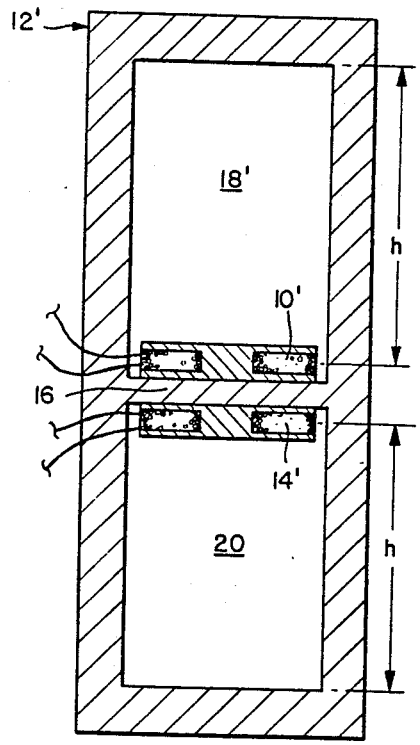
FIG. 2 is a view like FIG. 1 of a dual-chamber fiber force measuring device constructed in accordance with the teachings of the present invention.

In an alternate arrangement, the two coils 10' and 14' are located on opposite sides of wall 16;, FIG. 2, one at the bottom of one liquid chamber 18' and the other at the top of a second (nearly identical) liquid filled chamber 20 of a cylinder 12'. The two coils, 10' and 14, are connected in opposite arms of the same interferometer. If this device is accelerated vertically upward, the upper coil 10' would experience an increased pressure $\rho ah$ while the lower coil 14' would experience a corresponding decrease $-\rho ah$. Similarly, a change in gravitational constant, g, parallel to the axis of the device, will produce equal and opposite effects on the phase of the lightwaves in the two arms of the interferometer. If the sensor is given an acceleration at right angles to the axis of the device, both coils experience essentially the same pressure change, and that pressure change would be directed parallel to the plane of the coils. The device is therefore sensitive to axial accelerations and insensitive to cross-axis accelerations. Finally, the sensor may be operated either vertically or horizontally.

The cylinders 12 and 12' are made of a metal such as aluminum or stainless steel or a suitable plastic composition or other materials compatible with the fill fluid. The cylinders 12 and 12' illustrated in FIGS. 1 and 2, are cylindrical in the configuration however, as to be described in reference to FIGS. 3 and 4, the cylindrical configuration is not essential to the operation of the sensor of the invention.

The diameters of the cylinders 12 and 12' forming the chambers 18, 18' and 20 are not critical but are determined by the amount of fiber on the spools forming the coils 10 and 14 and 10' and 14'. It appears that the minimum diameter would be approximately 2 cm so that in winding the optical fiber on the spools, the fiber is not stressed or bent at too sharp an angle.

The spools are also made of metal or plastic and the fiber 15 employed in making the coils is a single mode optical fiber comprising a core 17 of silica, a cladding 19 and a jacket 21. The jacket (or buffer coating) should have both a high Young's modulus and a high compressibility and Teflon or nylon jackets 21 have been found to function very well. Where nylon or Teflon is employed as the jacket 21 for the fiber, a thin layer of silicone rubber is generally applied to the fiber to prevent slipping relative to the silica core.

Further, each of the two coils should have nearly the same length of fiber. This is especially important if diode lasers (e.g. GaAlAs) are used. Closely matched fiber lengths in the two coils are known to minimize the effect of laser phase noise. It has been determined that in order to achieve the optimum sensitivity the fiber length should match within about 1 mm.

The liquid for the chambers should have a high density and in a best mode application the liquid would be mercury.

It is also possible to employ a heavy solid body in the single chamber or the dual chambers 18, 18' and 20, however, a solid body can introduce some undesirable motions within the chambers.

Figure 3:
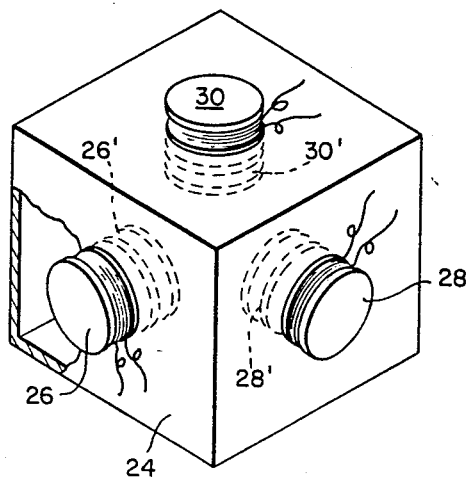
FIG. 3 diagrammatically illustrates a 6 coil fiber optic device.

As hereinbefore mentioned, the chambers need not be cylindrical. Referring to FIG. 3, there is shown a form of the invention wherein the chamber 24 is in the form of a hollow metal cube and three pairs of coils 26-26', 28-28' and 30-30' are secured to three of the faces of the cube. In such a construction, each of the coils of each pair would be connected in an arm of an interferometer. In the three pairs of coils form, three interferometers would be required.

Figure 4:
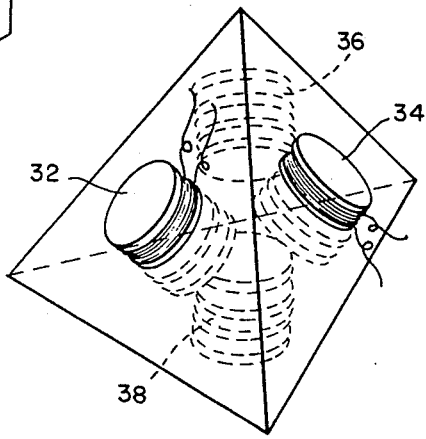
FIG. 4 diagrammatically illustrates an 8 coil fiber optic device.

In FIG. 4, the chamber is configured as a hollow tetrahedron with the coils 32-32', 34-34', 36-36' and 38-38' being mounted to the four faces of the tetrahedron. In this configuration, none of the four pairs of coils are parallel to another and, in this configuration, four interferometers would be required.

The transduction mechanism by which hydrostatic pressure produces a phase change in an optical fiber is discussed hereinafter. The phase, $\phi$, can be expressed in terms of the refractive index, n, the fiber length, L, and the wave number, k, by the equation $$\phi = knL \qquad (3)$$

where $k = 2\pi/\lambda_o$ and $\lambda_o$ is the wavelength of light in vacuum. Changes in k, n, and L result in changes in $\phi$. Mechanical forces applied to the fiber result in changes in $\phi$. Mechanical forces applied to the fiber result in changes in n and L and therefore in $\phi$. The corresponding expression relating these changes is obtained from Eq. 3 as follows:

$$\Delta\phi = k\Delta(nL) = knL\ (\Delta n/n + \Delta L/L) \quad (4)$$

where $\Delta L/L$ is the axial strain, $S_{11}$, and $\Delta n$ is given by $$\Delta n = -(n^3/2)\ [(p_{11}+p_{12})S_{12}+P_{12}S_{11}] \quad (5)$$

where $P_{11}$ and $P_{12}$ are the Pockel's coefficients and $S_{12}$ is the radial strain. For changes occuring at constant volume $S_{12} = -\frac{1}{2}S_{11}$. This assumption is good for jacket and mandrel materials used where the Poissons ratio approaches 0.5. In Hytrel$^c$ the value of Poissons ratio is 0.483. For other cases more exact treatments are available.

Combining Eqs. (4) and (5) and expressing $S_{12}$ in terms of $S_{11}$ yields $$\Delta\phi = knL\ ]1 + n^2(P_{11}-P_{12})/4]S_{11} \quad (6)$$

The strain, $S_{11}$, can be produced in a variety of ways: the use of specialized materials as the fiber jacket or as a mandrel on which the fiber is wound. The use of compliant, magnetostrictive, or thermally conductive materials results in acoustic, magnetic-field, or temperature sensors, respectively. In fused silica, $P_{11}=0.12$, $P_{12}=0.27$ and $n=1.46$. Substituting into Eq. (6) results in:

$$\Delta\phi = 0.92\ kLnS_{11} \quad (7)$$

The value of $S_{11}$ depends on the configuration of the optical fiber and the way the stresses are applied. If the fiber is wound around a mandrel or has a thick jacket, the value of $S_{11}$ will be dominated by the jacket or mandrel material. For an isotropic material subjected to hydrostatic pressure:

$$\Delta L/L = \Delta V/3V \approx (1/3V)\ (\partial V/\partial P)\Delta P \quad (8)$$

where V is the volume, P is the hydrostatic pressure, and $(1/V)\ (\partial V/\partial P)$ is the compressibility, K. Thus, Eq. (8) becomes $$\Delta\phi = 0.31\ kLnK\ \Delta P \quad (9)$$

This expression is valid in the case of thick coating where the pressure sensitivity is determined by the fiber jacket alone. For thinner jackets, $S_{11}$ is not a function only of jacket compressibility. For jackets of finite thickness, to first approximation, the value of $S_{11}$ varies from that of bare fiber to the thick fiber case represented by Eq. (9). For materials with a large Young's modulus, thick-jacket behavior can be achieved with relatively thin jackets. The ideal jacket material will therefore have large compressibility and large Young's modulus. Some materials that meet these requirements are Teflon, polyproylene, nylon, and Hytrel. Letting $\lambda_o = 0.82 \times 10^{-4}$ cm, $K = 2.67 \times 10^{-11}$ cm$^2$/dyne (Hytrel), and $n=1.46$, in Eq. 9 and solving for $\Delta P$ yields $$\Delta P = 1.08 \times 10^6 \Delta\phi/L$$

for $L = 100$ cm and $$\Delta\phi = 10^6 \text{ radians } \Delta P = 1.08 \times 10^{-2}\ \text{dynes/cm}^2(10^{-3}\text{pa}) \quad (10)$$

which agrees with experiment. These results are valid for the pressure differential experienced by a coil in one area of a Mach-Zehnder interferometer, FIG. 1. For one meter of fiber and $\Delta\phi_{min} = 10^{-4}$ radians, $\Delta P_{min} = 1.08$ dynes/cm$^2$. The value of $\Delta P_{min}$ is defined at $S/N=1$, measured in a 1-Hz band. As shown below, $S/N$ is dependent on the optical power. The results discussed above are valid for 15μW. Increased optical power will decrease the value of $\Delta P_{min}$.

The results of two specific examples are shown in FIG. 5. In each case the configuration shown in FIG. 2 is used; thus, $\Delta P_{min}$ obtained from EQ. 10 is decreased by a factor of two. The upper curve is calculated for a laboratory model seismometer which has been tested at 35 Hz (see the measured point +). In that seismometer $L=60$ m, $h=6$ cm, and a Mach-zehnder interferometer was employed. The lower curve is calculated for a seismometer employing a Michelson interferometer (therefore $\Delta P$ in Eq. 10 is reduced by an additional factor of 2) with $L=400$ m and $h=6$ cm. This design exhibits sensitivities comparable with conventional seismometers. Both curves are terminated at the shot-noise limit.

Some of the advantages which such an seismometer will have are listed below:

Threshold sensititivity less than ±1.0 nanometer for frequencies above the range 0.1 Hz
Dynamic range of 120 to 160 db
mechanical simplicity (essentially no moving parts)
Natural and structural resonances > 100 Hz
Damping not required
Electric and magnetic interference immunity
Transverse sensitivity inherently low as a result of two-coil design
Suitability of same seismometer for either vertical or horizontal orientation
Alignment of sensitive axis not critical
Warm-up period < one minute
Hysteresis effects not observed
Storage and operating life depends on electrical and optical components which are typically > $10^5$ hours
Calibration built in.

For small signals ($\Delta\phi < 0.1$ radian) and quadrature operation, the optical energy, Q, arriving at the photodetector is a linear function of $\Delta\phi$ given by the expression $$Q = Q_o A \Delta\phi \quad (11)$$

where A is the optical loss from all causes (splices, fiber attentuation, etc.) and $Q_0$ is the optical energy input to the sensing portion of the optical fiber. The corresponding current out of the photodetector, $i_s$, is $$i_s = Q_0 A q e \Delta\phi / h\nu \quad (12)$$

where q is the photodetector quantum efficiency, e is the charge on the electron, h is Planck's constant, and $\nu$ is the optical frequency. In order to obtain the shot-noise-limited signal-to-noise (S/N), the mean-square shot noise, $i_n$, in a frequency band, f, is $$\overline{i_N^2} = 2e^2(q/h\nu)\ Q_0 A \Delta f. \quad (13)$$

The expression for S/N defined as $i_s/i_n$ is $$S/N = Q_0 q A (\Delta\phi)^2/2h\nu\Delta f. \quad (14)$$

Setting $S/N=1$ in Eq. (14) and solving for $\Delta\phi$ yields the shot-noise-limited value of $\Delta\phi$ given by the expression $$\Delta\phi_{SNL} = [2h\nu\Delta f/Q_0qA]^{\frac{1}{2}} \quad (15)$$

Letting $\lambda_0 = 0.82 \times 10^{-4}$ cm, $Q_0A = 15\mu W = 150$ cgs units, $\Delta f = 1$, and $q = 0.5$ in Eq. 15 yields $\phi SNL = 2.1z$ $10^{-7}$ radians.

Combining Eqs. (15) and (9), letting $c_0 = \lambda_0\nu$ and $K = 1/B$, and solving for $\Delta P_{SNL}$ where $c_0$ and $\lambda_0$ are the velocity of light and wavelength in vacuum and B is the bulk modulus, results in the equation $$\Delta P_{SNL} = C B(\Delta f)^{\frac{1}{2}}/L(Q_0A)^{\frac{1}{2}} \quad (16)$$

with $$C = 0.484(h\lambda_0c_0)^{\frac{1}{2}}/q^{\frac{1}{2}} \quad (17)$$

Substituting appropriate values for Hytrel into Eqs. (16) and (17) yields $\Delta P_{SNL} = 2.27 \times 10^{-3}$ dynes/cm$^2$ in a 1 Hz band and 1 m of fiber.

The treatment of the two ends of the fiber optic coil is dependent on the type of interferometer selected to process the sensed perturbations. For example, if the Michelson interferometer is employed, FIG. 6A, then one of the fiber ends of, for example, coils 10 and 14, FIG. 6A or 10' and 14' in FIG. 2 is provided with a mirrored surface to reflect light back into the same fiber coil and the other ends are connected following the coupler, one in one of the legs and the other in the other of the legs of the interferometer. In this case the value of L is doubled.

If the Mach-Zehnder interferometer is employed, the ends of the coil are connected in the two legs of the interferometer as diagrammatically illustrated in FIG. 6B.

Optical phase modulation cannot be directly detected because the frequency of light is approximately $10^{14}$ Hz. Photodetectors are unable to respond to such high frequencies, i.e., they cannot follow the instantaneous values of such rapid frequency variations. Thus, for phase detection, an interferometric technique must be used to convert phase modulation to amplitude modulation before detection.

Two fiber optic interferometers are shown in FIGS. 6A and 6B. In the case of the Michelson interferometer, light from the laser is divided equally by the 3-db coupler 50 between the two arms of the interferometer. The light propagates down the optical fiber arms and coils 10 and 14 to the mirror-surfaced ends, is reflected back up the fiber, and recombined by the 3-db coupler. The interferometer may contain a phase modulator 52 shown in one arm of the interferometer to simulate a calibration signal or, as discussed below, to permit phase-locked-loop operation. Both functions can be employed by locating a separate phase modulator in each arm of the interferometer. The phase modulator consists of a piezoelectric cylinder around which a portion of the optical fiber is tightly wound. Electrical signals applied to the piezoelectric cylinder produce mechanical deformations in the optical fibers that result in optical phase changes. These changes are converted to amplitude changes when the light from the two arms is recombined in the 3-db coupler. The resulting amplitude-modulated light is then photo-detected.

In the case of the Mach-Zehnder interferometer shown in FIG. 6B, the 3-db coupler 50' on the left divides the output of the laser between the two interferometer arms, and the 3-db coupler on the right recombines the light. The photodetectors 40 and 40' on the right convert the optical signal to an electrical signal.

Using the 3-db coupler if the outputs of the two arms of the interferometer are initially in phase, they will interfere constructively when recombined. If the difference in phase, $\Delta\phi$, between the two arms of the interferometer increases because of an acceleration or change in the acceleration due to gravity, the amplitude of the output signal from both photodetectors 40 and 40' (FIGS. 6B and 9) decreases, reaching a minimum when $\Delta\phi = \lambda/2$ (i.e., $\pi$ radians). If the value of $\Delta\phi$ continues to increase, the output amplitude will increase, returning to its maximum value when $\Delta\phi$ becomes $2\pi$. The outputs of the two photodetectors 40 and 40' are combined in a differential amplifier 42, FIG. 9. Since the amplitude modulations of the current from the two photodetectors are 180° out of phase, combining the two signals in the differential amplifier rejects common-mode amplitude noise. In addition, by carefully matching the fiber length in the interferometer arms, laser phase noise can be reduced by five to six orders of magnitude. In this manner, values of $\Delta\phi = 10^{-6}$ radians and below can be detected at low frequency (i.e., <1 Hz).

Such feedback circuit also ensures that the interferometer is operated in its most sensitive mode. Any large amplitude drift (change) significantly increases the difficulty of measuring small changes. The signal to be considered will appear as a small amplitude perturbation on the photodiode circuit.

Figure 9:
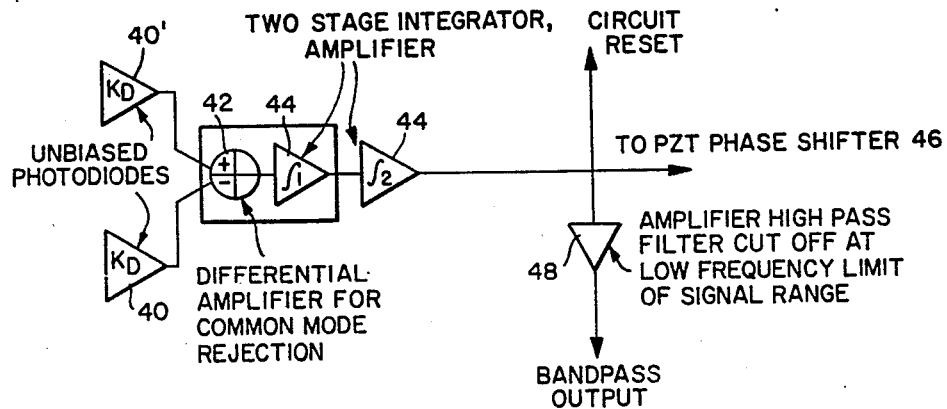
FIG. 9 is a diagrammatic view of a phase-locked-loop homodyne detection circuit.

Referring to FIG. 9, the output of the differential amplifier 42 is integrated in integration amplifer 44 and fed back to one of the optical-fiber-wound phase modulators 52 located in one or both arms of the interferometer. This introduces a phase shift equal and opposite to that caused by the combination of the signal and the noise. The result is to lock the relative phase at the point of maximum sensitivity. A schematic of a circuit to accomplish this is shown in FIG. 9.

Figure 8:
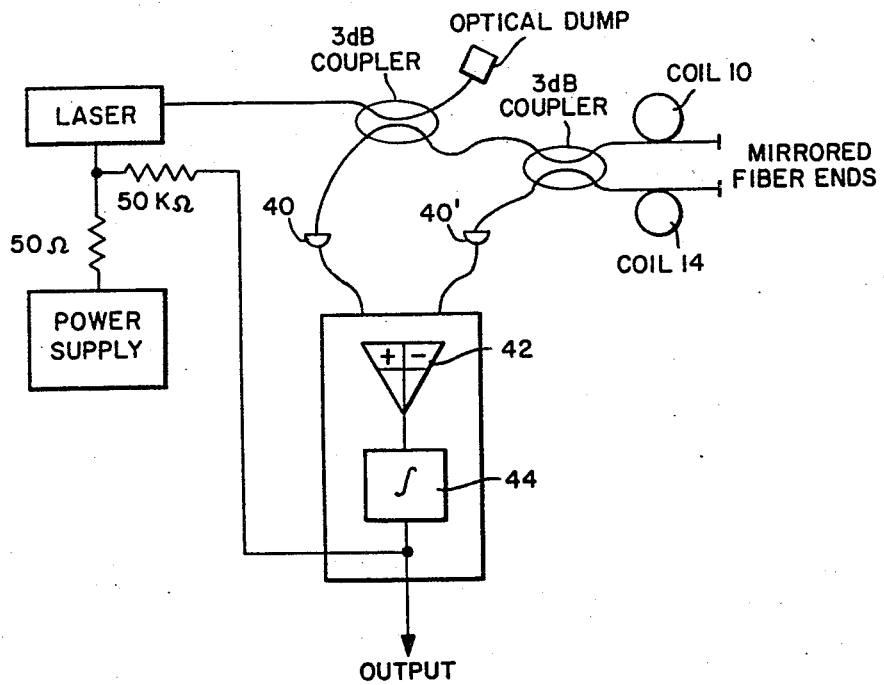
FIG. 8 illustrates diagrammatically a fiber optic Michelson interferometer with phase-lock-loop homodyne detection.

Two photodiodes 40-40' shown in FIGS. 8 and 9 are operated in an unbiased condition to eliminate dark current noise. Their outputs are combined in the differential amplifier that provides common-mode rejection as well as amplification. This is followed by one or more stages of integration and, possibly, additional amplification. These two integrator-amplifiers 44 pass all signals from DC up to the highest frequency of interest. The output of the two-stage integrator-amplifier 44 is applied to phase shifters 46 located in the arms of the interferometer. The output of the integrator-amplifier 44 is just equal to the low-frequency noise and the signal of interest. The effect is a phase shift in the interferometer arms equal to that causing the interferometer to remain in quadrature, i.e., to phase-lock the system. If the phase were exactly locked, there would be no output signal from the interferometer. However, there must be an error signal at the photodetectors 40 in order to have a feedback signal. The feedback circuit thus amplifies the error signal from the interferometer back to the level of the signal being detected. If the system is initially at a bias (operating or quiescent) point away from quadrature, there is insufficient output from the output from the interferometer for the compensation circuit, and the system will tend to drift toward an increasing error signal and therefore toward quadrature. In addition to establishing quadrature, the feedback circuit results in a dynamic range of as much as seven or eight orders of magnitude.

The signal out of the compensating circuit is also fed through a highpass filter 48 that has its low-frequency limit set at the lowest frequency of interest. Therefore, the resulting output is a band of frequencies corresponding to the frequency range of interest. This constitutes the output of the interferometric sensor.

In the mode of detection shown in FIG. 9, operational amplifiers 44 (op amps) and CMOS components are used in the feedback circuit. These circuits provide voltages are on the order of ±10 volts to the phase modulator 46. The reset circuit tracks the voltage applied to the phase modulator, and before the voltage limit of the circuit is reached, the phase modulator is rapidly reset to the initial condition and the tracking process begins again. The phase change resulting from a large-amplitude slow drift is compensated for by a number of saw-toothed-like small-amplitude phase changes.

As a seismometer, the quality of interest is the minimum detectable displacement $d_{min}$ given in terms of $a_{min}$ by the equation $$d_{min} = a_{min}/\omega^2 \qquad (18)$$

where $\omega = 2\pi f$ and f is the frequency of the disturbance being measured.

Solving Eqs. (1) for $a_{min}$ and substituting in Eq. 18 yields $$d_{min} = \Delta P_{min}/\rho h \omega^2 \qquad (19)$$

As a specific example consider a Michelson configuration in FIG. 2 which decreases Eq. 10 by a factor of 4 and letting $\Delta\phi = 10^{-6}$, h=6 cm, $\rho = 13.5$ g/cm$^3$ (for mercury), and 400 m of fiber per coil we obtain $$d_{min} = 2.1 \times 10^{-2}/f^2 \text{(nanometer)} \qquad (20)$$

Thus, at 1 Hz, a displacement of a quarter of a nanometer can be detected. If the configuration shown in FIG. 1 is used, the above value will be increased by a factor of 2. This expression Eq. 20 is shown versus frequency plotted as a broken line in FIG. 7. The solid curve is calculated for the two-coil laboratory seismometer. It utilized a Mach-Zehnder interferometer configuration (see FIG. 2) with 60 m of optical fiber in each coil and a 6 cm separation between coils. This result is based on $\Delta\phi_{min} = 10^{-4}$ radians. The two coils were located in opposite ends of the same mercury-filled cylinder. The point at 35 Hz exhibiting a measured displacement of close to $10^{-11}$m is the experimental result obtained with this device. The experimental result agrees closely with those calculated. This same device used as a gravimeter with the value of $\Delta\phi_{min}$ increased to $2.5 \times 10^{-4}$ radians can detect 0.02 mgal. This is comparable with the best presently available gravimeters. The predicted performance for the two-coil fiber optic seismometer, for which Eq. (20) applies (broken line) is comparable to that exhibited by commercially available devices indicated by A, B and C. These conventional seismometers, although capable of extreme sensitivity, suffer from several substantial limitations. A comparison of conventional and fiber optic seismometers is given in Table 1. As can be seen, fiber optic seismometer of the type described above exhibit numerous advantages over conventional devices.

In the case of the application as a gravimeter, the minimum detectable change in g is $10^{-5}$ cm/sec$^2$ ($=10^{-5}$ gal)

$$\Delta g_{min} = \frac{\Delta P_{min}}{\rho h}$$

Thus, the device considered herein configured as in FIG. 2 and with $\Delta\phi_{min} = 10^{-4}$ radians, is capable of detecting changes in g equivalent to the most sensitive presently available gravimeters (0.01 mgal).

TABLE 1

| COMPARISON OF CONVENTIONAL AND FIBER OPTIC SEISMOMETERS | | |
|---|---|---|
| | Conventional Seismometer | Proposed Fiber Optic Seismometer |
| 1. Size | Mechanical complexity and range mass leads to large size. | Mechanically simple/effectively no moving parts, can be made small enough for bore hole use. |
| 2. Spurious Modes | Complex mechanical suspension system leads to spurious resonance | Design produces a high resonant frequency (>1 KHz; does not use delicate spring-mass construction). (Single device can operate from <0.1 Hz to >100 Hz.) |
| 3. Dynamic Range | As large as 120 db. Can record tens of nanograms but fails in .1 g to 1 g range associated with local earthquakes. | Can achieve 160 db dynamic range by using phase-lock-loop detection. Can measure 10 nano-g to 1 g in the same instrument. |
| 4. Leveling | Use of pendulous spring-mass system requires exceedingly precise leveling and thus more equipment in the bore hole. | Relatively insensitive to leveling because of its mechanical construction which leads to cosine dependence on tilt angle. |
| 5. Vertical and Horizontal Orientations | Impossible to make both instruments identical because of difference in suspension system. | Can use the identical instrument for either vertical or horizontal operation. |
| 6. Cost | Range from $3 to $10K | Should be competitive with conventional. |

I claim:

1. A force measuring device comprising a substantially hollow three-dimensional container defining interiorly thereof at least one chamber; at least a pair of optical fiber coils; the length of the optical fiber on each of said coils being substantially equal; means mounting said at least one pair of coils on opposite sides of a wall of the hollow container; means within the container normally exerting a force on the coil mounted within the container; an optical interferometer having a pair of legs; means connecting each of said pair of coils in a leg of the interferometer; radiant energy emitting means for directing radiant energy into the legs of the interferometer and through the said pair of coils; and radiant energy detecting means connected to said interferometer.

2. The force measuring device as defined in claim 1 wherein the means within the container normally exerting a force on the coil mounted within the container comprises mercury.

3. The force measuring device as defined in claim 1 wherein the interferometer is a Michelson interferometer.

4. The force measuring device as defined in claim 1 wherein the interferometer comprises a Mach-Zehnder interferometer.

5. The force measuring device as defined in claim 1 wherein the hollow three-dimensional container is a cylinder.

6. The force measuring device as defined in claim 1 wherein the hollow three-dimensional container is a cube.

7. The force measuring device as defined in claim 1 wherein the hollow three-dimensional container is a tetrahedron.

8. The force measuring device as defined in claim 1 wherein the chamber is provided with a transverse wall dividing the interior of the chamber into a pair of chambers; and wherein said transverse wall comprises the wall mounting the at least one pair of coils.

9. The force measuring device as defined in claim 5 wherein the cylinder is provided with a transverse wall dividing the interior of the cylinder into a pair of chambers; and wherein said transverse wall comprises the wall mounting the at least one pair of coils.

10. The force measuring device as defined in claim 6 wherein there are three pairs of fiber optic coils.

11. The force measuring device as defined in claim 7 wherein there are four pairs of fiber optic coils.

12. The force measuring device as defined in claim 3 wherein one end of each of the fiber optic coils is provided with a mirrored surface.

13. The force measuring device as defined in claim 1 wherein the source of radiant energy comprises a laser.

14. The force measuring device as defined in claim 10 wherein there are three interferometers to which said three pairs of coils are connected.

15. The force measuring device as defined in claim 11 wherein there are four interferometers, one for each of the four pairs of coils.

16. The force measuring device as defined in claim 14 wherein the interferometers are Michelson interferometers.

17. The force measuring device as defined in claim 15 wherein the interferometers are Michelson interferometers.

18. The force measuring device as defined in claim 14 wherein the interferometers are Mach-Zehnder interferometers.

19. The force measuring device as defined in claim 15 wherein the interferometers are Mach-Zehnder interferometers.

20. The force measuring device as defined in claim 2 wherein the optic fibers of each of the coils are single mode jacketed fibers.

21. The force measuring device as defined in claim 1 wherein the hollow container is metal.

22. The force measuring device as defined in claim 21 wherein the metal is aluminum.

23. The force measuring device as defined in claim 1 wherein the hollow three-dimensional container is stainless steel, glass or plastic.

* * * * *